Patented Jan. 26, 1932

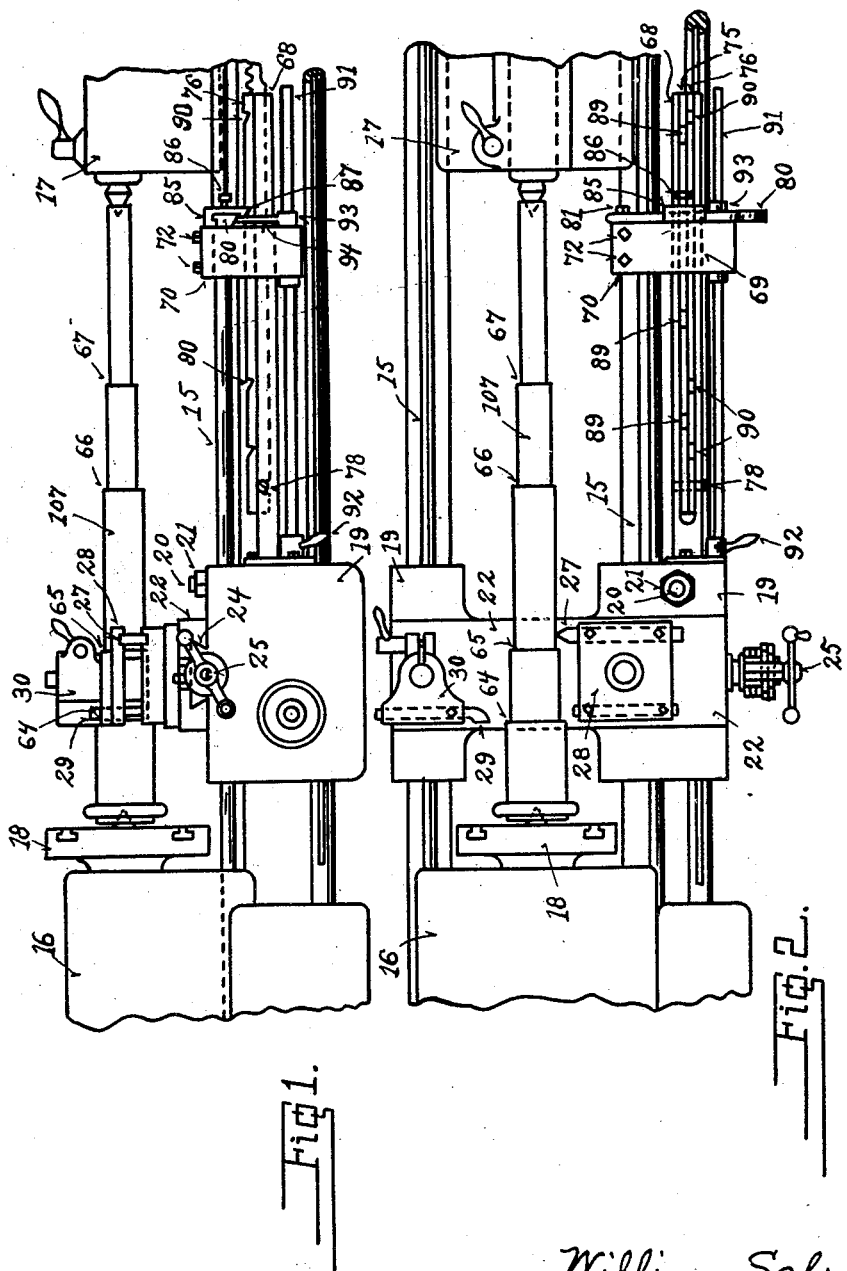

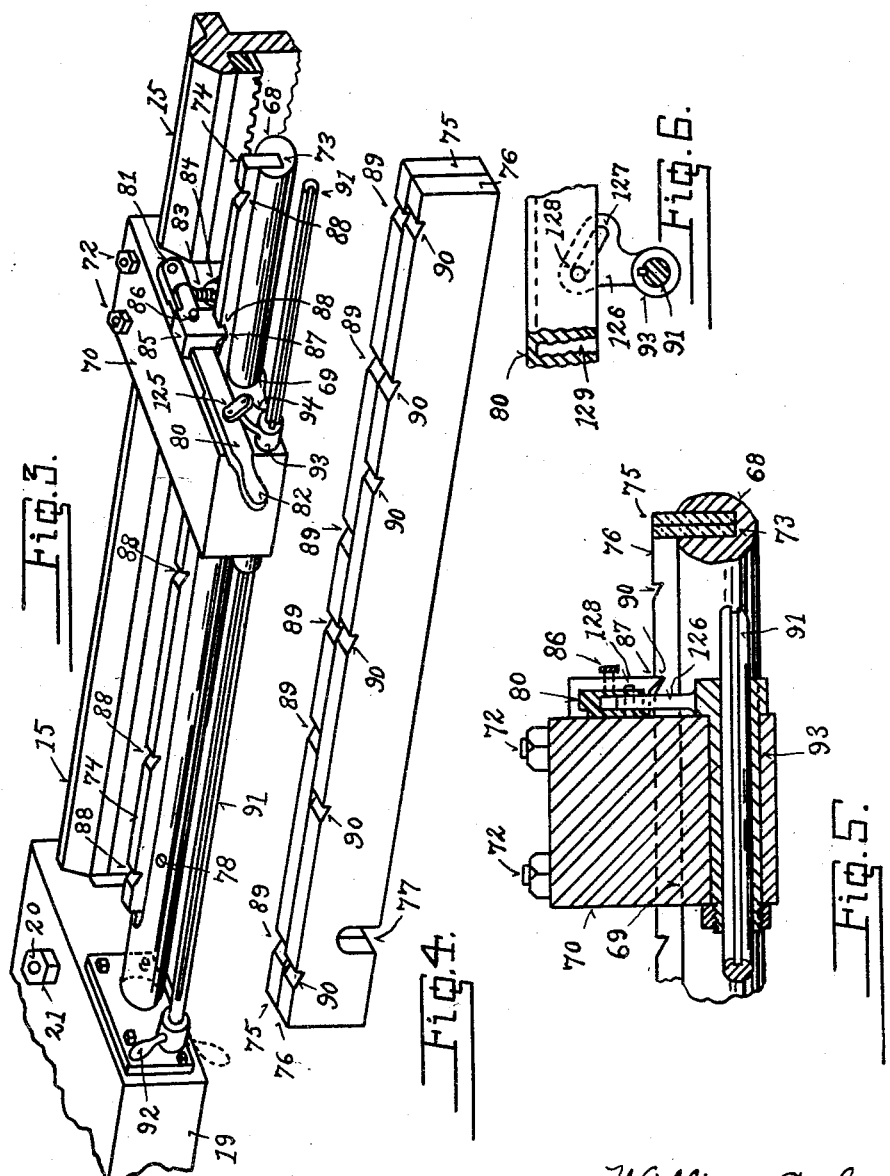

1,842,802

UNITED STATES PATENT OFFICE

WILLIAM SCHRODER, OF COVINGTON, KENTUCKY, ASSIGNOR TO THE SEBASTIAN LATHE COMPANY, OF CINCINNATI, OHIO, A CORPORATION OF OHIO

MACHINE TOOL STOP MECHANISM

Original application filed March 3, 1926, Serial No. 92,082. Divided and this application filed October 16, 1929. Serial No. 400,148.

My invention relates to improvements in stop mechanism for lathes and other machine tools, and is a divisional application from my original application Serial No. 92,082, filed March 3, 1926. One object is to provide improved tool carriage longitudinal feed stop mechanism. Another object is to provide improved stop feed mechanism, whereby a series of work, or stock, members may be successively dressed at different sections to duplicate dimensions, and whereby the shoulders separating such stock member sections may be accurately dressed and spaced to uniform dimensions. Another object is to provide improved longitudinal stop feed mechanism adapted to be set for relatively short as well as long spacing. Another object is to provide improved stop feed mechanism adapted to stop a tool carriage provided with a plurality of tools to independently position the respective tools as to their cross-feed. Another object is to provide stop feed mechanism adapted to stop a tool carriage provided with a plurality of tools to independently position the respective tools as to their longitudinal feed. My invention also comprises certain details of form and arrangement, and combination of components, all of which will be fully set forth in the description of the accompanying drawings in which:

Fig. 1 is a front elevation of a portion of a lathe embodying my improved stop mechanism.

Fig. 2 is a plan of the same.

Fig. 3 is a perspective view of a portion of the lathe bed tool-carriage and longitudinal stop mechanism in Figs. 1 and 2.

Fig. 4 is a perspective view of a pair of the longitudinal stop bars detached, and illustrating a modification of the stop bar shown in Figs. 1, 2 and 3.

Fig. 5 is a sectional detail through a portion of the longitudinal stop mechanism shown in Fig. 3.

Fig. 6 is a detail partly in section showing a modification.

The accompanying drawings illustrate the preferred embodiments of my invention in which 15 represents the lathe ways or lathe bed; 16 the lathe headstock, and 17 the tailstock, and 18 the chuck. A main tool carriage 19 is mounted upon the lathe ways intermediate of the head-stock and tail-stock, and is adapted to be fed longitudinally of the ways 15, either by hand feed or by power feed in the customary manner. A clamping bolt 20 and nut 21 enable the tool carriage to be rigidly clamped to the lathe ways when desired. A slide or cross feed tool carriage, 22, is mounted upon guides 24 carried by the main tool carriage to travel transversely of the lathe ways upon and relative to the main tool carriage. A cross feed screw 25 is journaled in a sleeve rigidly mounted upon the main tool carriage. The cross feed screw is preferably adapted to be optionally driven by hand or by power in either direction in customary manner. The screw 25 engages a nut attached to the cross-feed tool carriage by means of which the cross-feed tool carriage is fed transversely of the lathe ways in either direction. A single tool 27, and tool holder 28 may be adjustably mounted upon the cross-feed tool carriage, if desired, but I preferably provide a second tool 29, and tool holder 30 therefor, also detachably mounted upon the cross-feed tool carriage 22.

My improved apparatus is designed to be applied to stop the tool or tools at predetermined positions of the cross-feed and also predetermined positions of the longitudinal feed of the tools, to thereby enable a relatively large number of pieces of work or stock 107 to be successively produced of duplicate dimensions.

The cross feed and cross feed stop mechanism is constructed and operated as specified in detail in my said original application Serial No. 92,082.

In conjunction with the cross feed stop mechanism, in order that the shoulders 64, 65, 66, and 67 of the respective or successive work members 107 may be accurately spaced at predetermined distances apart, I provide stop mechanism adapted to be employed to stop the longitudinal feed of the main tool carriage successively for each work piece at predetermined positions. This longitudinal stop mechanism comprises a supporting bar 68 attached to one end of the tool carriage 19 and movable therewith along the lathe bed. The free end of the bar 68 passes through a recess 69 in a block or carriage 70 which is mounted to move along the lathe bed, and is adapted to be rigidly clamped to the lathe bed by means of clamping bolts 72. The recess 69 serves to support and guide the free end of the bar 68. The bar 68 has a longitudinal recess 73 which serves to detachably and interchangeably receive and support a series of stop bars. In Fig. 3 I have illustrated the use of a single stop bar 74, while in Figs. 2 and 4 I have illustrated two stop bars 75 and 76 arranged side by side, and adapted to be jointly employed interchangeably with the bar 74. A separate stop bar or set of stop bars is designed to be employed for each type of work member to be turned out in duplicate. The stop bars 74, 75 and 76 are each provided on their lower edge with a notch or recess 77 to engage over a cross bolt 78 which spans the recess in the bar 68 in which the stop bars seat to hold the stop bars longitudinally in place. A latch bar 80 is pivotally attached to one side face of the carriage 70 at 81, and at its free end is provided with a hand lever 82. A coiled spring 83 seated upon a projection 84 extending from the carriage 70 engages the under face of the latch bar 80 to normally hold said latch bar in an elevated or inoperative position. A slide or carriage 85 is mounted upon the latch bar 80 to have a limited sliding movement endwise of the latch bar 80, and is preferably locked by means of a spring actuated latch member 86 to a series of predetermined positions relative to the latch bar 80. The slide 85 is provided along its lower edge with a tooth 87 adapted to engage any one of a series of notches 88 in the upper face of the stop-bar 74, and also by adjusting the slide 85 endwise of the latch bar 80, to enable one end of the tooth 87 to engage any one of the notches 89 of the stop bar 75 and the opposite end of the tooth 87 to engage any one of the notches 90 of the stop bar 76.

Where the shoulders 64, 65, 66 and 67 of the work members are spaced considerable distances apart, a single bar 74 with notches 88 across its entire face is adapted to be employed. Where however the spaces between the shoulders 64, 65, 66 and 67 of the work are relatively short, I preferably employ a plurality of bars 75 and 76 and adjust the slide 85 upon the latch bar 80 to enable opposite ends of the tooth 87 to selectively engage the notches 89 and 90, and thereby space the work member shoulders close together.

In order that the slide 85 may be lifted out of engagement with the notches 88, 89, 90, of the spacing bars from a position of the operator in front of the tool carriage, I provide a splined shaft 91 attached and journaled at one end to the end of the tool carriage and provided with a hand lever 92 by means of which said shaft 91 may be rocked. The free end of shaft 91 is mounted in and keyed to a sleeve 93 which is journaled to the carriage 70. The sleeve 93 is provided with a crank arm 94 connected by a link 125 with the latch bar 80 to lift the latch bar, see Fig. 3, and thereby disengage the tooth 87 from engagement with any one of the notches 88, 89 and 90.

The operation, employing my improved stop mechanism is as follows. Having prepared a master pattern or work member, a pair of cross feed stop members are prepared and attached to the cross-feed screw, and also a longitudinal stop bar 74 with notches 88, calculated or measured from the master pattern, is prepared. If required two stop bars 75 and 76 with notches 89 and 90 are prepared instead of a single bar 74. The stop bar or bars are then mounted upon the bar 68 in its recess 73. Commencing for instance at one end of a work member 107, the cross feed is set at its first stop, and one cylindrical section of the work member is faced nearly its entire length, leaving the shoulder at its end to be accurately gauged by a finish cut, using the longitudinal stop mechanism. The cross feed is then reset to a different position and the next cylindrical section of the work member is faced, and so on until all cylindrical faces of the work member are faced to dimensions, using cross feed stops. In order to effect the finish cuts of these shoulders, the cross-feed carriage is adjusted to bring the tool 29 into position ready to operate upon the work, then the tool carriage is fed manually longitudinally until the tooth 87 enters one of the stop recesses of the stop bars 74, 75 or 76 as the case may be, so as to cause the tooth 87 when pressed or held down to stop or limit the longitudinal feed of the tool carriage, which brings the tool accurately into positon to make a finish cut across one of the transverse shoulders on the work member. The bolt 20 and nut 21 are or may be then employed to clamp the tool carriage rigidly to the lathe bed. The tool 29 is then fed by the cross-feed screw to face the first shoulder. The nut 21 is released and the tooth 87 is then released, and the tool carriage fed longitudinally to a position where the latch tooth 87 engages the next stop notch of the bar 74, 75, or 76, which brings the tool into accurate position to face the next shoulder of the work, and so on until all of the work shoulders have been finished. At each shoulder the tool carriage is clamped by the bolt 20 and nut 21 to the lathe bed, while the cross-feed screw is employed to feed the tool across the face of the shoulder to be faced with a finish cut until the rotation of the cross-feed screw brings the cross feed stop member into action to limit the cross feed of the tool. If desired a finish longitudinal cut may be taken at the same time that the shoulder is faced, and as a continuation of the same cut, and this would bring the latch tooth 87 into position to engage the next longitudinal stop recess of the stop bar 74 and position the tool cariage ready to face the next work shoulder. The respective cross-feed and longitudinal stop members may be employed in various orders and combinations depending upon the type of work required to be duplicated in quantity. The tooth 87 may be temporarily held down in engagement with its stop notch by a weight acting on lever 80, or by a suitable latch member.

In the modification shown in Fig. 6 and also in Fig. 5 the shaft 91 is provided with a crank arm 126 which has a cam slot 127. The arm 126 enters a recess 129 in the lower face of the latch bar 80, and the cam slot 127 is engaged by a pin 128 carried by the latch bar 80 and spanning the recess 129. This modification serves to positively feed the latch bar 80 through the rock shaft 91 in either direction up or down.

The invention herein shown and described is capable of considerable modification within the scope of the claims without departing from the spirit of my invention.

What I claim is:

1. A stop mechanism for machine tools comprising in combination with a machine tool a main tool carriage mounted thereon to move longitudinally thereof, a stop support having connection with the tool carriage and movable longitudinally of the machine tool in unison with said tool carriage and guided in a way relative to said machne tool, a stop bar detachably mounted upon said stop support and provided with a plurality of stop faces, and a latch bar carried by said machine tool and adapted to successively engage said stop faces to repeatedly stop said tool carriage at predetermined positions relative to said machine tool.

2. A stop mechanism for machine tools comprising in combination with a machine tool, a main tool carriage mounted thereon to move longitudinally thereof, a stop support provided with a supporting channel and movable longitudinally of the machine tool in unison with said tool carriage and guided in a way relative to said machine tool, a connection between the stop support and said carriage, a stop bar detachably mounted in said supporting channel longitudinally of said stop support and provided with a plurality of stop faces, and a latch bar carried by said machine tool and adapted to successively engage said stop faces to repeatedly stop said tool carriage at predetermined positions relative to said machine tool.

3. A stop mechanism for machine tools comprising in combination with a machine tool, a main tool carriage mounted thereon to move longitudinally thereof, a stop support having connection with the tool carriage and movable longitudinally of the machine tool in unison with said tool carriage and guided in a way relative to said machine tool, and provided with a longitudinal channel and a cross pin therein, a stop bar detachably mounted in said channel and in engagement with said pin to prevent movement of said stop bar relative to said stop support, said stop bar being provided with a plurality of stop faces, and a latch bar carried by said machine tool and adapted to successively engage said stop faces to repeatedly stop said tool carriage at predetermined positions relative to said machine tool.

4. A stop mechanism for machine tools comprising in combination with a machine tool, a main tool carriage mounted thereon to move longitudinally thereof, a stop support having connection with the tool carriage and movable longitudinally of the machine tool in unison with said tool carriage and guided in a way relative to said machine tool, a plurality of stop bars detachably mounted upon said stop support and each provided with a plurality of stop faces and a latch bar carried by said machine tool and adjustable to engage the stop faces of each of said stop bars independently of the stop faces of the other stop bar to repeatedly stop said tool carriage at predetermined positions relative to said machine tool.

5. A stop mechanism for machine tools comprising in combination with a machine tool, a main tool carriage mounted thereon to move longitudinally thereof, a stop support having connection with the tool carriage and movable longitudinally of the machine tool in unison with said tool carriage and guided in a way relative to said machine tool, a stop bar detachably mounted upon said stop support and provided with a plurality of stop faces, a latch bar carried by said machine tool and adapted to successively engage said stop faces to repeatedly stop said tool carriage at predetermined positions relative to said machine tool, and a rock bar movable in unison with said tool carriage and operatively connected to said latch bar to lift said latch bar out of engagement with the respective stop faces of said stop bar.

6. A stop mechanism for machine tools comprising in combination with a machine tool, a main tool carriage mounted thereon to move longitudinally thereof, a stop support having connection with the tool carriage and movable longitudinally of the machine tool in unison with said tool carriage and guided in a way relative to said machine tool, a plurality of stop bars detachably mounted upon said stop support and each provided with a plurality of stop faces, a latch bar carried by said machine tool having a transversely adjustable latch member to independently engage the stop faces of the respective stop bars to repeatedly stop said tool carriage at predetermined positions relative to said machine tool, and means movable with said tool carriage and operable to lift said latch member out of engagement with the stop faces of said stop bars.

7. A stop mechanism for machine tools comprising in combination with a machine tool, a main tool carriage mounted thereon to move longitudinally thereof, a stop guide adjustable longitudinally of the machine tool and adapted to be clamped rigidly in position relative to said machine tool, a stop support attached at one end to said tool carriage and movable longitudinally of said machine tool with said tool carriage and guided near its opposite end in a way on said stop guide, said stop support being provided with a guideway to detachably support a stop bar, a stop bar detachably mounted relative to said stop support and provided with a plurality of stop faces, a latch member carried by said stop guide and adapted to successively engage said stop faces to repeatedly stop said tool carriage at predetermined positions relative to said machine tool, and means attached to said tool carriage and guided by said stop guide and operable to lift said latch member out of engagement with the respective stop faces of said stop bar.

In testimony whereof I have affixed my signature.

WILLIAM SCHRODER.